Patented Oct. 16, 1923.

1,470,765

UNITED STATES PATENT OFFICE.

JOHN H. RYAN, OF KALAMAZOO, MICHIGAN.

SATIN WHITE AND PROCESS OF MANUFACTURE.

No Drawing. Application filed May 6, 1920, Serial No. 379,316. Renewed March 7, 1923.

*To all whom it may concern:*

Be it known that I, JOHN H. RYAN, a citizen of the United States, residing at Kalamazoo, and State of Michigan, have invented certain new and useful Improvements in Satin White and Processes of Manufacture, of which the following is a specification.

This application is a continuation in part of my application for patent filed Sept. 22, 1919, Serial No. 325,466.

The invention relates to an improved method of preparing "satin white" for the purpose of coating paper and to the improved product.

As heretofore manufactured it has been a matter of great difficulty to eliminate the grit from "satin white" to secure the best results in the coating of paper. This elimination has been attempted by grinding and screening in many well known ways. It has been necessary to ship the material with a large water content.

The object of my invention is to provide an improved treatment of such "satin white" in which the grit is eliminated without the process of screening and a very smooth and effective coating material is secured, and one which may be dried out for shipment, with consequent saving in freight.

Objects which pertain to details and economies will definitely appear from the detailed description to follow. The invention is clearly defined and pointed out in the claims.

In carrying out my improved process I first dissolve 43 parts of alum in about 160 parts of water, the amount of water not being very material so long as there is enough of it to completely dissolve the alum. I next take 50 parts by weight of lime and slake it with sufficient water to fully hydrate it, it usually requiring about 300 parts of water. When this is done I add the alum solution to the lime slowly and agitate the whole mass thoroughly to secure a mixture. This results in a thick creamy mass.

I then place this thick creamy mass in a pebble grinding mill and add only sufficient water to the mass to cause the same to flow like a thin dough. I subject the mass to the action of the pebble mill until the whole is ground to a smooth creamy mixture, the time consumed varying somewhat but requiring usualy an hour or more. The pebbles of course contact with the grit and grind the same in the usual way, but because of the action of the pebbles in rolling and tumbling through the pasty mass, there is an action on the material which is quite comparable to what takes place when candy is pulled. Colloids are in this way developed and the broken grit is distributed through the entire mass in very fine particles, and it is not in position or condition to reform into any appreciable lump or form crystals of any appreciable size.

After this grinding I add sufficient water to flush the paste from the pebble mill and reduce it to a comparatively thin solution. I then pass the same to a tank to settle and then draw off the excess of water which carries off any excess of alkali solution.

Sizing is then added, consisting of dissolved casein or glue or hydrated starch. An alkaline compound of some description, usually caustic soda, is included with the sizing. The mass is returned to the pebble grinding mill and ground and mixed for 20 or 30 minutes. It is then ready for the coating machines.

If it is not desired to use this "satin white" at once, the sizing material should not be added but the paste should be passed to a filter, preferably a vacuum filter, the excess water drawn off so far as possible, and the material dried, preferably in a drum drier, and broken up into small parts or pulverized to a powder and put into bags for shipping. After the material has been thus dried, it can be soaked up with two parts of water to one of the dried material, the proper amount of sizing, as the usual solutions of casein, glue or hydrated starch with alkali compound, added and the material put into a pebble mill and brought into condition for use as a coating material within twenty to thirty minutes. The same is suitably diluted if necessary to the required consistency.

From this description it will be seen that it is now possible to prepare "satin white" and dry the same and ship it in bags, which is a matter of very great saving over old methods where it is required to be shipped in the damp and plastic condition, with about two parts of water to one of solid content. This extra water makes a very burdensome freight rate and, as it is necessary that this material be shipped and stored in tight barrels to avoid leakage and evaporation, the matter of cooperage and return of the empty barrels is an added burden incident to the transportation, all of which is obviated by treating the material as I have treated it. My treatment greatly facilitates the preparation, utilizes the entire solid content of the ingredients, and avoids the heavy expense of screening out the coarse particles, which has been the practice to date.

My improved dry material has a distinct appearance, different from the usual material, and I wish to claim the same in this dry form.

Having thus described my invention what I claim as new and desire to secure by Letters Patent is:

1. The process of preparing "satin white" consisting in dissolving 43 parts of alum in about 160 parts of water, taking 50 parts by weight of lime, slaking the same in sufficient water to fully hydrate the lime, about 300 parts of water, adding the alum solution to the lime gradually with agitation, adding sufficient water to reduce the material to a thick creamy mass, placing this mass in a pebble grinding mill in the form of a thin dough and acting on the same by the pebbles of the mill grinding the grit and admixing the same, filtering and drying the composition, thereafter mixing the same in water to a thick creamy mass, adding sizing solutions with an alkaline compound, and grinding the same in a pebble mill until the entire mass is mixed and pulverized, as described.

2. The process of preparing "satin white" consisting in dissolving 43 parts of alum in about 160 parts of water, taking 50 parts by weight of lime, slaking the same in sufficient water to fully hydrate the lime, about 300 parts of water, adding the alum solution to the lime gradually with agitation, adding sufficient water to reduce the material to a thick creamy mass, placing this mass in a pebble grinding mill in the form of a thin dough and acting on the same by the pebbles of the mill grinding the grit and admixing the same, and filtering and drying the composition, as described.

3. The process of preparing "satin white" consisting in dissolving 43 parts of alum in about 160 parts of water, taking 50 parts by weight of lime, slaking the same in sufficient water to fully hydrate the lime, about 300 parts of water, adding the alum solution to the lime gradually with agitation, adding sufficient water to reduce the material to a thick creamy mass, placing this mass in a pebble grinding mill in the form of a thin dough and acting on the same by the pebbles of the mill grinding the grit and admixing the same, and thereafter adding sizing solutions with an alkaline compound, and grinding the same in a pebble mill until the entire mass is mixed and pulverized, as described.

4. The process of preparing "satin white" consisting in mixing the ingredients thereof in the proper proportions in the usual way, with the addition of sufficient water and only sufficient water to reduce the same to a thin doughy condition, subjecting the same to the action of a pebble grinding mill until the grit is pulverized and the mass thoroughly admixed by the action of the pebbles, thereafter adding sizing solutions with an alkaline compound, and further grinding and admixing in the said pebble mill.

5. A "satin white" material in which the grit matter is pulverized and distributed in fine particles through the colloidal mass, as described.

6. A "satin white" material in dry form in which the grit matter is pulverized and distributed in fine particles through the colloidal mass, as described.

In witness whereof, I have hereunto set my hand and seal in the presence of two witnesses.

JOHN H. RYAN. [L. S.]

Witnesses:
LUELLA G. GREENFIELD,
MARGARET L. GLASGOW.